US008487019B2

(12) United States Patent
Nelson et al.

(10) Patent No.: US 8,487,019 B2
(45) Date of Patent: Jul. 16, 2013

(54) FILLED RESINS AND METHOD FOR MAKING FILLED RESINS

(75) Inventors: James M. Nelson, Woodbury, MN (US); Matthew N. Archibald, St. Paul, MN (US); Brant U. Kolb, Afton, MN (US); Wendy L. Thompson, Roseville, MN (US); William J. Schultz, North Oaks, MN (US); Steven C. Hackett, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 240 days.

(21) Appl. No.: 12/933,526

(22) PCT Filed: Mar. 26, 2009

(86) PCT No.: PCT/US2009/038408
§ 371 (c)(1),
(2), (4) Date: Sep. 20, 2010

(87) PCT Pub. No.: WO2009/120868
PCT Pub. Date: Oct. 1, 2009

(65) Prior Publication Data
US 2011/0028605 A1 Feb. 3, 2011

Related U.S. Application Data

(60) Provisional application No. 61/040,329, filed on Mar. 28, 2008.

(51) Int. Cl.
*C08J 3/02* (2006.01)
*C08K 9/00* (2006.01)

(52) U.S. Cl.
USPC ............ 523/200; 523/212; 523/333; 523/340

(58) Field of Classification Search
USPC .................................. 523/200, 212, 333, 340
See application file for complete search history.

(56) References Cited

U.S. PATENT DOCUMENTS

| | | | |
|---|---|---|---|
| 2,801,185 A | 5/1952 | Iler | |
| 3,018,262 A | 1/1962 | Schroeder | |
| 3,298,998 A | 1/1967 | McConnell | |
| 3,562,223 A | 2/1971 | Bargain | |
| 3,627,780 A | 12/1971 | Bonnard | |
| 3,704,863 A * | 12/1972 | Meyer et al. ................... | 366/131 |
| 3,839,358 A | 10/1974 | Bargain | |
| 4,076,550 A * | 2/1978 | Thurn et al. ................... | 106/490 |
| 4,100,140 A | 7/1978 | Zahir | |
| 4,157,360 A | 6/1979 | Prevorsek | |
| 4,468,497 A | 8/1984 | Street | |
| 4,522,958 A | 6/1985 | Das | |
| 5,453,262 A | 9/1995 | Dawson | |
| 5,648,407 A | 7/1997 | Goetz | |
| 6,149,850 A * | 11/2000 | Gannon ........................ | 264/211 |
| 6,602,936 B1 | 8/2003 | Arnoux et al. | |
| 6,653,000 B2 * | 11/2003 | Jinbo et al. ................... | 428/845.2 |
| 6,713,534 B2 * | 3/2004 | Goerl et al. .................... | 523/333 |
| 7,033,975 B2 | 4/2006 | Baran | |
| 7,241,437 B2 | 7/2007 | Davidson | |
| 2002/0055580 A1 | 5/2002 | Lorah | |
| 2003/0035756 A1 | 2/2003 | Nelson | |
| 2003/0220204 A1 | 11/2003 | Baran | |
| 2004/0138343 A1 | 7/2004 | Campbell et al. | |
| 2005/0063898 A1 | 3/2005 | Chisholm | |
| 2006/0074167 A1 * | 4/2006 | Nelson et al. ................. | 524/445 |
| 2006/0135669 A1 | 6/2006 | Ryang | |
| 2006/0148950 A1 | 7/2006 | Davidson | |
| 2007/0003463 A1 | 1/2007 | Ajiri | |
| 2007/0032560 A1 | 2/2007 | Suemura | |
| 2007/0098990 A1 | 5/2007 | Cook | |
| 2008/0090947 A1 * | 4/2008 | Shin et al. ..................... | 524/131 |
| 2010/0267881 A1 | 10/2010 | Tiefenbruck | |
| 2012/0059086 A1 * | 3/2012 | Nelson et al. ................. | 523/340 |

FOREIGN PATENT DOCUMENTS

| | | |
|---|---|---|
| EP | 0 452 711 | 10/1991 |
| JP | 2003-286306 | 10/2003 |
| JP | 2004-051681 | 2/2004 |
| JP | 2004-331883 | 11/2004 |
| KR | 10-2007-0098781 | 10/2007 |
| WO | WO 2004/113455 | 12/2004 |
| WO | WO 2005/026252 | 3/2005 |
| WO | WO 2005/080498 | 9/2005 |

(Continued)

OTHER PUBLICATIONS

Adschiri et al., *J. Am. Ceram. Soc.*, 75 (4), 1019-1022 (1992).
Epoxy Resins, Chemistry and Technology, Second Edition, edited by C. May, Marcel Dekker, Inc., New York (1988).
Handbook of Epoxy Resins by Lee and Neville, McGraw-Hill Book Co., New York (1967).
Handbook of Thermoset Plastics (Second Edition), William Andrew Publishing, p. 122 (1998).
Iler, The Chemistry of Silica, John Wiley & Sons, New York (1979).
Schmidt, et al., "Fabrication of agglomerate-free nanopowders by hydrothermal chemical processing", *Mater. Res. Soc. Symp. Proc.*, vol. 520, Warrendale, PA pp. 21-31 (1998).
Adachi et al, "Novel Synthesis of Submicrometer Silica Spheres in Non-alcoholic Solvent by Microwave-assisted Sol-Gel Method", Sep. 2004, Chemistry Letters, vol. 33, No. 11, pp. 1504-1505.
Kappe et al, "Microwaves in Organic and Medicinal Chemistry", 2005, Wiley VCH, pp. 39-40.

(Continued)

*Primary Examiner* — Vickey Nerangis
(74) *Attorney, Agent, or Firm* — Douglas B. Little

(57) ABSTRACT

A method of making a filled resin includes providing functionalized particles; and combining and homogenously mixing the functionalized particles with an organic matrix in a vacuum kneader to provide the filled resin so that the functionalized particles comprise at least about 20% by weight of the filled resin. The step of providing functionalized particles can also include providing a feedstock of (i) untreated particles, (ii) a surface treatment agent reactive with the particles, and (iii) solvent, and directing the feedstock through a continuous reactor maintained at a temperature sufficient to react the particles with the surface treatment agent to provide the functionalized particles in less than about 4 hours; and directing the functionalized particles from the continuous reactor directly into the vacuum kneader. In another aspect, the a finished resin comprises at least about 20% by weight of functionalized particles in an organic matrix.

10 Claims, 2 Drawing Sheets

FOREIGN PATENT DOCUMENTS

| | | |
|---|---|---|
| WO | WO 2006/063317 | 6/2006 |
| WO | WO 2007/024838 | 3/2007 |
| WO | WO 2007/031775 | 3/2007 |
| WO | WO 2007/119993 | 10/2007 |
| WO | WO 2008/022614 | 2/2008 |
| WO | WO 2008/027979 | 3/2008 |
| WO | WO 2009/110945 | 9/2009 |
| WO | WO 2009/120846 | 10/2009 |
| WO | WO 2009/131910 | 10/2009 |
| WO | WO 2010/080459 | 7/2010 |

OTHER PUBLICATIONS

Paulus et al., "Scale up of Microwave Assisted Polymerizations in Continuous Flow Mode", Feb. 21, 2007, Macromolecular Rapid Communications, 2007. 28, pp. 484-491.

* cited by examiner

FILLED RESINS AND METHOD FOR MAKING FILLED RESINS

CROSS REFERENCE TO RELATED APPLICATIONS

This application is a national stage filing under 35 U.S.C. §371 of PCT/US2009/038408, filed Mar. 26, 2009, which claims priority to U.S. Provisional Application No. 61/040,329 filed Mar. 28, 2008.

The present invention relates to filled resins and a method of making a filled resin.

BACKGROUND

Uncured polymeric materials that are reinforced with insoluble particles are generally referred to as "compounded resins" or "filled resins." One type of filled resin is a nanoparticle-filled resin which, by definition, includes a particulate that has one or more dimensions measured on a nanometer scale. When cured, the resulting materials incorporating nanoparticles, or "nanocomposites," may exhibit enhanced properties including electrical or thermal conductivity or enhanced optical properties or mechanical properties such as stiffness and strength, for example.

Product applications for nanocomposites and other filled resins typically require thorough mixing of the particles within the polymer matrix with minimal agglomeration. In some instances, the surfaces of the particles are modified to add functional groups to make the particles more compatible with the polymer matrix. However, the achievement of a thoroughly mixed filled resin with low particle agglomeration is more difficult in highly viscous polymers and/or where high particle loadings are desired. Moreover, the use of batch manufacturing processes for such filled resins can be labor intensive and expensive. Consequently, economic applications for filled resins, including nanocomposites, have been limited.

SUMMARY

The present invention provides improvements to the manufacture of filled resins comprised of particles in an organic matrix.

In one aspect, the invention provides a method of making a filled resin, comprising: Providing functionalized particles; and combining and homogenously mixing the functionalized particles with an organic matrix in a vacuum kneader to provide the filled resin, the functionalized particles comprising at least about 20% by weight of the filled resin.

In another aspect, the invention provides the method as stated above, wherein providing functionalized particles further comprises: Providing a feedstock, the feedstock comprising: (i) untreated particles, (ii) a surface treatment agent reactive with the particles, and (iii) solvent; directing the feedstock through a continuous reactor maintained at a temperature sufficient to react the particles with the surface treatment agent to provide the functionalized particles in less than about 4 hours; and directing the functionalized particles from the continuous reactor directly into the vacuum kneader.

In still another aspect, the invention provides a finished resin comprising at least about 20% by weight of functionalized particles in an organic matrix.

Various terms used herein to describe aspects of the present invention will be understood to have the same meaning known to those skilled in the art. For clarification, certain terms will be understood to have the meaning set forth herein.

"Organic matrix" refers to a polymeric material or a precursor (e.g., monomer or oligomer) to a polymeric material.

"Substantially symmetric particles" refers to particles that are relatively symmetric in that the length, width and height measurements are substantially the same and the average aspect ratio of such particles is approximately 1.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used herein, the recitation of numerical ranges by endpoints includes all numbers subsumed within that range (e.g., 1 to 5 includes 1, 1.5, 2, 2.75, 3, 3.8, 4, and 5).

As included herein, the singular form of a noun that follows the indefinite article "a" or "an" is to be presumed to encompass the plural form of the noun unless the context clearly dictates otherwise.

BRIEF DESCRIPTION OF THE FIGURES

In describing embodiments of the invention, reference is made to the Figures in which components of the embodiments are identified with reference numerals and wherein like reference numerals indicate like components, and wherein.

Figure 1:
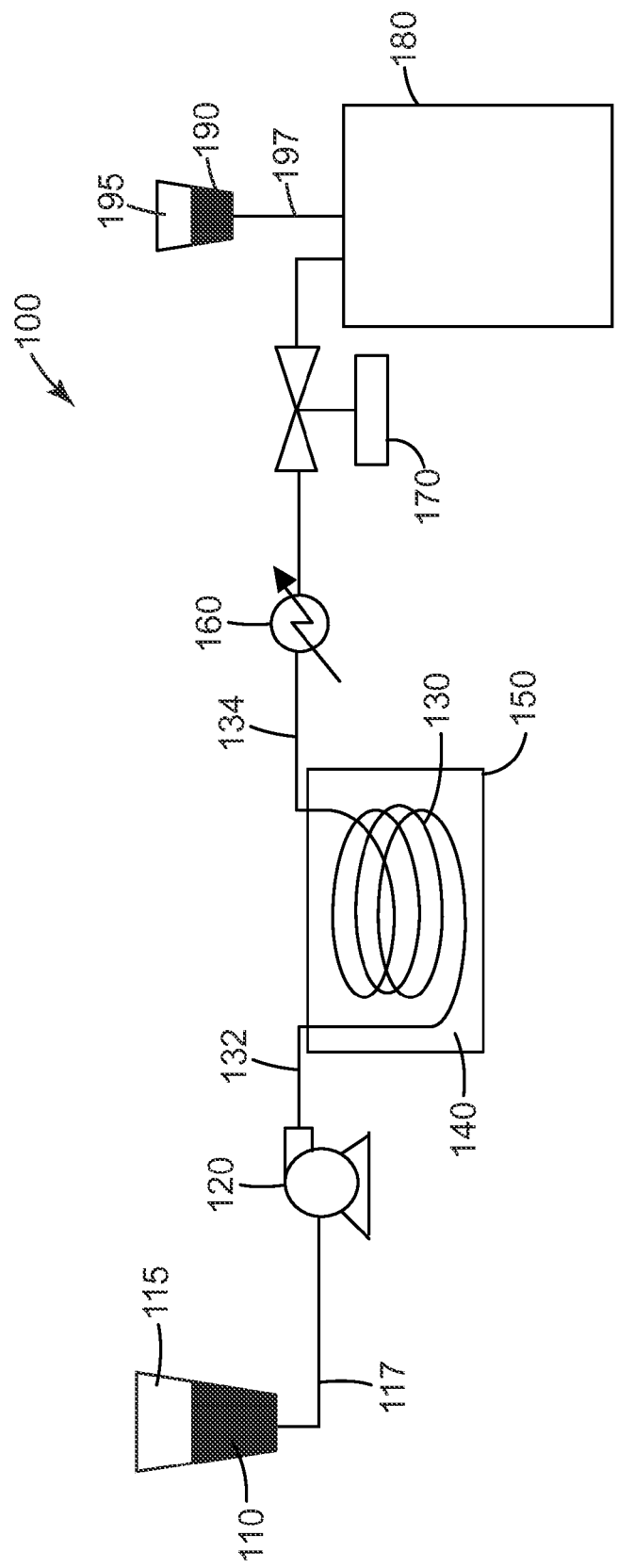
FIG. 1 is a schematic of a continuous manufacturing process according to an embodiment of the invention.

Those skilled in the art will further understand the features of the invention upon consideration of the embodiments described in the remainder of disclosure including the Detailed Description and the Examples.

DETAILED DESCRIPTION

The present invention provides filled resins and methods for making filled resins. While specific embodiments of the invention are described herein, the filled resins of the invention include functionalized particles in an organic matrix. Methods for the manufacture of such filled resins include combining and homogenously mixing the functionalized particles with an organic resin in a kneader to provide the filled resin. In embodiments of the invention, the method of the invention can include first functionalizing or surface-modifying untreated particles and immediately incorporating the functionalized (surface-modified) particles into an organic matrix to provide a filled resin. The process can be performed in a batch mode as well as in a continuous mode. In some embodiments, the surface-modified particles react with (e.g., forming covalent bonds) the organic matrix to become part of the final matrix structure. In such embodiments, surface-modified particles comprise surface treatment agents with a first functional group attached to the surface of a particle, and a second functional group capable of reacting with other components of the matrix (e.g., polymer) system.

In some embodiments of the invention, particles are substantially symmetric. By way of example, substantially symmetric particles include those that are substantially spherical, substantially cubic, or the like. In other embodiments, the particles useful in the invention are not symmetric in all three spatial measurements.

In embodiments of the invention, the particles are relatively uniform in size and non-aggregating when included in a sol. However, useful particles may be any of a variety of sizes depending on the desired use of the final functionalized product. Useful particles include microparticles as well as nanoparticles. In some embodiments, the particles are microparticles in that they have an average thickness (e.g., length, width and/or height) of one micrometer or greater. In some embodiments, the particles have an average thickness up to about 30 micrometers. In some embodiments, the particles are nanoparticles in that they have an average thickness of less than about one micrometer, in some embodiments less than about 500 nm, in some embodiments less than about 100 nm, and in some embodiments less than about 50 nm. In some embodiments, the particles are substantially symmetric.

Functionalized particles are prepared by reacting one or more surface treatment agents with the untreated particles. In some embodiments, untreated particles comprise organic materials, and in other embodiments the untreated particles comprise inorganic materials. In embodiments of the invention, untreated particles may be selected from broad categories of inorganic materials that include without limitation metals, inorganic oxides, inorganic sulfides, inorganic antimonides, inorganic salts, inorganic nitrides, metallic particles, metal coated particles, for example. Suitable organic materials include, for example, carbon black and organic pigments.

Functionalized or surface-modified particles are combined with an organic matrix to form a filled resin. In embodiments of the invention, the filled resin comprises a high concentration of functionalized particles. In some embodiments, the filled resin comprises more than one type of functionalized particle (e.g., more than one material and/or more than one average particle size). In some embodiments, the functionalized particles comprise functionalized nanoparticles. In such embodiments, the functionalized nanoparticles may be present in the finished resin at a concentration of at least about 20% by weight. In some embodiments, functionalized nanoparticles may be present in the finished resin at a concentration of at least about 30% by weight, in some embodiments at least about 40% by weight, in some embodiments at least about 50% by weight, at least about 60% by weight, at least about 65% by weight, at least about 70% by weight or at least about 75% by weight. In some embodiments, functionalized nanoparticles are present in the finished resin at a concentration no greater than about 80% by weight, no greater than about 70% by weight, no greater than about 65% by weight, no greater than about 60% by weight, no greater than about 50% by weight, no greater than about 40% by weight, no greater than about 30% by weight. In some embodiments, the organic matrix of the filled resin comprises at least one polymer, and in some embodiments more than one polymer. In some embodiments, the organic matrix may comprise oligomer and/or monomer. In still other embodiments, the organic matrix may comprise monomer, oligomer and/or polymer.

The functionalized particles are combined with an organic matrix in a kneader to thoroughly mix the particles in the organic matrix while also removing liquids (e.g., solvents). The kneader provides an environment conducive to completing the dispersion process.

As mentioned, the process of the present invention can be performed in a batch mode wherein untreated particles are first functionalized in a separate distinct process step and a quantity of the functionalized particles are added to the kneader along with a measured quantity of organic matrix. Once added to the kneader, the matrix and the functionalized particles are thoroughly mixed as described herein.

In some embodiments, the process of the invention is performed in a continuous mode. In some continuous process embodiments, untreated particles are treated with surface treatment agent(s) and the reaction product or effluent from the surface treatment reaction is directed into the kneader where the functionalized particles are mixed with organic matrix, excess solvent is removed and the matrix is fully mixed to provide a high loading of functionalized particles in a resin.

Kneaders suitable for use in the invention are available commercially such as, for example, those available under the trade designation "LIST." One such kneader is a high viscosity processor (HVP) commercially available as the LIST DISCOTHERM B6 kneader from List AG, Acton, Mass. This HVP has a horizontal, cylindrical body with a concentric agitator shaft. Mounted on the shaft (and extending perpendicular to the shaft) are disk elements having angled peripheral mixing-kneading bars and stationary hook-shaped bars mounted on the inside of the housing that interact with and clean the shaft and disk elements as they rotate. The HVP has a twin-screw discharge for material removal. The total volume of the HVP is 17.5 liters, with a working volume of 12 liters. The housing, shaft, and disk elements are all heated via a hot oil heating system. The heat transfer area in the reactor is 0.67 $m^2$. Temperature is controlled and monitored in three locations within the HVP: (1) the reactor entrance zone (zone 1), (2) the reactor intermediate zone (zone 2) and (3) the reactor exit zone (zone 3). A variable speed motor drives the agitator shaft at a maximum torque of 1200 Nm. A vacuum pump is attached to the reactor at the top of zone 2 for vapor removal. This high viscosity processor provides intensive mixing and kneading in combination with large heat-transfer surfaces and long residence times. The heat transfer surfaces are continuously swept by kneading elements, which increases thermal efficiency and ensures high heat transfer rates. The inner cavity also has a relatively large working volume (i.e., volume occupied by the reaction mixture) and fill level, thus allowing for high throughput and long retention times. Yet, the working volume occupies only about 60 percent of the total volume of the reactor, which provides ample room to allow for disengagement and flashing of off-gases and vapors as they are brought to the bulk surface by the intensive mixing.

An example of a kneader suitable for use in a batch system, fitted with a vacuum system, is that available from IKA Labortechnik, Janke & Kunkel Gmbh & Co. KG, Germany, under the trade designation "MKD 0,6-H 60 IKAVISC," a high-performance measuring kneader.

Another example of a suitable high performance kneader is commercially available under the trade designation "SRUGO SIGMA KNEADER" from Srugo Machines Engineering, Netivot, Israel. This kneader is equipped with vacuum ports for connection to vacuum equipment.

The use of a high viscosity vacuum kneader technology provides a means to disperse a high loading of functionalized particles in an organic matrix in a manner that results in a final filled resin with minimal particle agglomeration. In some embodiments, the level of particle agglomeration in the final resin is less than about 10% agglomeration at a particle loading of at least about 20% by weight. As known by those skilled in the art, the level of agglomeration may be determined by SEM inspection of a finished resin through statistical analysis of area plots in a micrograph to determine the particle size distribution.

The kneader can be a component in a system that operates in a continuous mode. For example, the functionalization of particles can be accomplished in a continuous hydrothermal reactor, as described below wherein functionalized particles in an effluent from a continuous hydrothermal reactor may be directed into the kneader and mixed with an organic matrix without the need to first separate or dry down the particles within the effluent prior to their addition to a matrix. Solvent removal may be accomplished during mixing in the kneader by the application of heat and a partial vacuum, removing water as well as organic solvent from the matrix (e.g., polymer) and functionalized particles. Additionally, the kneader is capable of mixing the functionalized particles with viscous (e.g., greater than about 30,000 centipoise) polymer systems including thermosetting polymers, thermoplastic polymers, elastomers, and the like.

In some embodiments, the kneader handles a feedstock comprising organic matrix, particles and solvent wherein the solvent level is in the range from about 30% to about 50% by weight as it enters the kneader, and is devolatilized so that the solvent level is in the range of 0.5% or less as the resulting filled resin exits the kneader.

An embodiment of a system 100 running in a continuous mode according to the invention is shown schematically in FIG. 1. A feedstock 110 comprises surface treatment agent(s) and untreated particles (e.g., colloidal silica nanoparticles) in a sol. Feedstock 110 is mixed and placed within feed tank 115. The feed tank 115 is connected with tubing or piping 117 to pump 120. Tubing or piping 117 can be constructed of any suitable (e.g., non-reactive) material such as polymeric materials or ceramic materials, for example. In some embodiments, the tubing or piping 117 can be polyethylene tubing or polypropylene tubing in the portions of the continuous hydrothermal reactor system 100 that are not heated and that are not under high pressure. Pump 120 is provided to pump the feedstock 110 from feed tank 115 through tubing or piping 117 into inlet 132 of tubular reactor 130. Pump 120 may be of any type that is capable of pumping against the elevated pressure typically maintained within the tubular reactor 130. The flow of feedstock 110 into the tubular reactor 130 is controlled by pump 120 which may provide a constant flow rate or a non-constant or pulsed flow rate.

As used herein, "tubular reactor" refers to the portion of the continuous hydrothermal reactor system that is typically maintained at an elevated temperature (i.e., the heated zone). Although tubular reactor 130 is shown in FIG. 1 as a coil of tubing, it will be appreciated that the tubular reactor can have any suitable shape. The shape of the tubular reactor is often selected based on the desired length of the tubular reactor and the method used to heat the tubular reactor. For example, the tubular reactor can be straight, U-shaped, or coiled. The interior portion of the tubular reactor can be smooth/flat or can contain baffles, balls, or other known means for mixing components that are passed therethrough.

As shown in FIG. 1, the tubular reactor 130 is placed in a heating medium 140 within a heating vessel 150. The heating medium 140 can be, for example, an oil, sand or the like that can be heated to a substantially elevated temperature. In embodiments where the surface treatment agent is a hydrolysable organosilane (e.g. trialkoxysilane), the heating medium is heated to a temperature above the hydrolysis and condensation temperatures of the surface treatment agent. Suitable oils for heating medium 140 include, for example, plant oils such as peanut oil and canola oil. Some plant oils are preferably kept under nitrogen when heated to prevent or minimize oxidation of the oils. Other suitable oils include polydimethylsiloxanes such as those commercially available from Duratherm Extended Fluids (Lewiston, N.Y.) under the trade designation "DURATHERM S." The heating vessel 150 can be any suitable container that can hold the heating medium and withstand the heating temperatures used for the tubular reactor 130. The heating vessel 150 can be heated using any suitable means. In many embodiments, the heating vessel 150 is positioned inside an electrically heated coil (not shown). Alternatively, other types of heaters such as, for example, induction heaters, fuel-fired heaters, heating tape, and steam coils can be used in place of the heating vessel 150, the heating medium 140, or both.

The tubular reactor 130 can be made of any material capable of withstanding the temperatures and pressures used to prepare functionalized particles. The tubular reactor 130 preferably is constructed of a material that is resistant to damage when exposed to reaction conditions of the surface treatment reaction. For example, organoacids may be used as surface treatment agents in some embodiments of the invention. In such embodiments, carboxylic acids can be present in the feedstock or can be produced as a reaction byproduct within the continuous hydrothermal reactor system, and the tubular reactor should be resistant to corrosion or other damage in the presence of such acids. In some embodiments, the tubular reactor is made of stainless steel, nickel, titanium, carbon-based steel, or the like. In some embodiments, the tubular reactor 130 can be provided as a plug flow stirred tubular reactor, as described in U.S. patent application Ser. No. 09/824,330, Publication No. US 2003/0035756 A1, published on Feb. 20, 2003, entitled "A Continuous Process for the Production of Combinatorial Libraries of Materials."

In embodiments of the invention, the heating medium 140 maintains the feedstock in the tubular reactor 130 at a temperature above the normal boiling point of the solvent used in the feedstock at a pressure that is equal to or greater than the pressure required to prevent boiling of the medium. A feedstock is continually introduced into a heated zone of the tubular reactor 130 and an effluent is continually removed from the heated zone of the tubular reactor. The introduction of the feedstock and removal of the effluent can be constant or intermittent (e.g., pulsed).

In embodiments, an interior surface of the tubular reactor 130 can be coated with a fluorinated polymeric material such as, for example, a fluorinated polyolefin. In some embodiments, the polymeric material is polytetrafluoroethylene ("PTFE") such as that available under the trade designation "TEFLON" from DuPont (Wilmington, Del.). Some tubular reactors may comprise a flexible hose of a fluorinated polymeric material, such as a hose comprised of PTFE, contained within a metal housing such as a braided stainless steel housing. Surprisingly, heat transfer through a fluorinated polymeric material can be sufficient to convert the particles and surface treatment agent(s) in the feedstock to functionalized particles under continuous hydrothermal conditions. The fluorinated polymeric surface is particularly advantageous for use with feedstock solutions and/or reaction products that contain carboxylic acids. These carboxylic acids can leach metals from some known hydrothermal reactors such as those constructed of stainless steel.

The second end 134 of tubular reactor 130 connects to a suitable cooling device 160. In some embodiments, the cooling device 160 is a heat exchanger that includes a section of tubing or piping with an outer jacket filled with a cooling medium such as chilled water. In other embodiments, the cooling device 160 includes a coiled section of tubing or piping placed in a vessel that contains chilled water. In either of these embodiments, the reactor effluent is passed through the section of tubing and is cooled from the temperature of tubular reactor 130 to a temperature no greater than 100° C., in some embodiments no greater than 80° C., no greater than 60° C., no greater than 40° C. or no greater than 25° C. In some embodiments, the section of tubing is cooled to a temperature no greater than 10° C. Other cooling devices that contain dry ice or refrigeration coils can also be used. After cooling, the reactor effluent is discharged into kneader 180. In alternate embodiments, a twin screw extruder (not shown) may be positioned in the system 100 before the kneader 180.

The pressure inside tubular reactor 130 can be at least partially controlled with a backpressure valve 170, which is generally positioned between the cooling device 160 and the kneader 180. The backpressure valve 170 controls the pressure at the exit of the continuous hydrothermal reactor system 100 and helps to control the pressure within the tubular reactor 130. The backpressure is often at least 100 pounds per square inch (0.7 MPa), at least 200 pounds per square inch (1.4 MPa), at least 300 pounds per square inch (2.1 MPa), at least 400 pounds per square inch (2.8 MPa), at least 500 pounds per square inch (3.5 MPa), at least 600 pounds per square inch (4.2 MPa), or at least 700 pounds per square inch (4.9 MPa). In some embodiments, the backpressure is greater than about 700 pounds per square inch (4.9 MPa). The backpressure should be maintained at a pressure that is high enough to prevent boiling within reactor 130.

The dimensions of tubular reactor 130 can be varied and, in conjunction with the flow rate of the feedstock, can be selected to provide suitable residence times for the reactants within the tubular reactor. As used herein, the term "residence time" refers to the average length of time that the feedstock is within the heated zone of the continuous hydrothermal reactor system. That is, the residence time is the average time the feedstock is within the tubular reactor 130 and is equal to the tubular reactor volume divided by the flow rate of the feedstock. Any suitable length tubular reactor can be used provided that the residence time is sufficient to convert the feedstock to functionalized particles. The tubular reactor often has a length of at least 0.5 meter, at least 1 meter, at least 2 meters, at least 5 meters, at least 10 meters, at least 15 meters, at least 20 meters, at least 30 meters, at least 40 meters, or at least 50 meters. The length of the tubular reactor in some embodiments is less than 1000 meters, less than 500 meters, less than 400 meters, less than 300 meters, less than 200 meters, less than 100 meters, less than 80 meters, less than 60 meters, less than 40 meters, or less than 20 meters.

In some embodiments, tubular reactors with a relatively small inner diameter are used. For example, tubular reactors having an inner diameter no greater than about 3 centimeters can provide a relatively fast rate of heating of the feedstock. Also, the temperature gradient across the tubular reactor 130 is smaller for reactors with a smaller inner diameter compared to those with a larger inner diameter. However, if the inner diameter of the tubular reactor 130 is too small, there is an increased likelihood of the reactor becoming plugged or partially plugged during operation resulting from deposition of material on the walls of the reactor. The inner diameter of the tubular reactor 130 is often at least 0.1 centimeters, at least 0.15 centimeters, at least 0.2 centimeters, at least 0.3 centimeters, at least 0.4 centimeters, at least 0.5 centimeters, or at least 0.6 centimeters. In some embodiments, the diameter of the tubular reactor 130 is no greater than 3 centimeters, no greater than 2.5 centimeters, no greater than 2 centimeters, no greater than 1.5 centimeters, or no greater than 1.0 centimeters. Some tubular reactors have an inner diameter in the range of 0.1 to 3.0 centimeters, in the range of 0.2 to 2.5 centimeters, in the range of 0.3 to 2 centimeters, in the range of 0.3 to 1.5 centimeters, or in the range of 0.3 to 1 centimeter.

In an alternative to increasing the inner diameter of the tubular reactor 130, multiple tubular reactors may be used wherein each reactor has a smaller inner diameter with two or more such reactors arranged in parallel. Tubular reactor 130, can be broken into two or more sections of tubing having different inner diameters and made of different materials. For example, a first section of tubing could be of smaller diameter relative to a second section to facilitate faster heating of the feedstock solution in the smaller diameter tubing prior to being held at the desired process temperature in the second section. In one embodiment, a first section of the tubular reactor 130 is made of stainless steel tubing having an inner diameter of 1 centimeter, and a second section is made of PTFE tubing contained within stainless steel housing and having an inner diameter of 2 centimeters.

Flow rate of the feedstock through the tubular reactor can be varied as long as the residence time is sufficiently long to convert the feedstock to functionalized particles. Higher flow rates are desirable for increasing throughput and minimizing the deposition of materials on the walls of the tubular reactor. The flow rate may be selected based on the residence time needed to convert the feedstock to functionalized particles. A higher flow rate can often be used when the length of the tubular reactor is increased or when both the length and diameter of the tubular reactor are increased. The flow through the tubular reactor can be laminar, turbulent or plug flow.

In embodiments of the invention, tubular reactor 130 is held at a temperature that is greater than the hydrolysis and condensation reaction temperatures of the surface treatment agent(s). The temperature is often at least 130° C., at least 140° C., or at least 150° C. If the temperature is too high, the pressure of the tubular reactor may be unacceptably high. The temperature is typically no greater than 230° C., no greater then 225° C., or no greater than 220° C. In many embodiments, the reaction temperature is selected to be in the range of 130° C. to 230° C., in the range of 140° C. to 220° C., in the range of 140° C. to 200° C., in the range of 150° C. to 200° C., or in the range of 150° C. to 180° C.

The residence time of the feedstock within tubular reactor 130 can be varied by altering the length of the tubular reactor as well as by altering the flow rate of the feedstock solution. In many embodiments, the residence time is at least 2 minutes, at least 4 minutes, at least 6 minutes, at least 8 minutes, or at least 10 minutes. The residence time is typically no greater than 4 hours, no greater than 2 hour, no greater than 90 minutes, no greater than 60 minutes, or no greater than 50 minutes. In many embodiments, the residence time is in the range of 2 to 90 minutes, in the range of 2 to 60 minutes, in the range of 5 to 60 minutes, or in the range of 5 to 50 minutes.

Prior to placement within kneader 180, effluent from the hydrothermal reactor tube 130 may be collected in a separate vessel (not shown) so that at least a portion of the solvent, (e.g., water) in the effluent may be removed prior to mixing the functionalized particles with an organic matrix. In some embodiments, effluent can be dried at an elevated temperature to facilitate solvent removal.

In a continuous mode of operation, however, effluent is directed from reactor tube 130, through cooling device 160 and backpressure valve 170 and directly into kneader 180, typically without the need for first reducing solvent levels in the effluent. Organic matrix 190 is fed to the kneader 180 through tubing or piping 197 from a second feed tank 195 into the kneader 180 where it is mixed with functionalized particles contained in the effluent from reactor 130. Kneader 180 is typically equipped with or connected to a vacuum pump (not shown) to allow the atmosphere within the inner cavity of the kneader to be at least partially evacuated. Preferably, the kneader 180 is capable of being heated (e.g., by an internal heat source) to raise the temperature of the mixture of organic matrix and functionalized particles to facilitate the removal of solvent from the mixture and provide conditions conducive to the chemical reactions needed to polymerize the matrix and to incorporate the functionalized particles therein to provide a cured resin.

In embodiments wherein the functionalized particles comprise nanoparticles, the resulting nanocomposite may be expected to exhibit enhanced properties such as enhanced optical properties, dielectric properties, thermal properties or mechanical properties such as stiffness and strength. When the above described continuous manufacturing process is employed, the invention provides cost savings by eliminating the need for initial particle isolation of the functionalized nanoparticles and the need for a subsequent redispersion of such particles. A continuous system maintains the manufacturing process in a closed system, thus avoiding the handling of dry nanoparticles. The combination of intensive mixing and kneading with large heat-transfer surfaces and long residence times enables the removal of solvent and water with relative ease, and the heat transfer surfaces of the kneader are continuously swept to increase thermal efficiency and ensure high heat transfer rates. The invention allows for the use of a wide variety of monomer (epoxy, vinyl ester, acrylate) and polymer samples (hot melt, solution, pouched adhesives), with or without solvent. The plug flow nature of the continuous reactor system allows for nanocomposite formation with particle loadings that can be varied in a combinatorial fashion.

Following the formation of a nanocomposite, a finishing step can be performed by feeding non-particle containing polymers into the kneader in series with the nanocomposite resin to "let down" the overall nanoparticle concentration. The use of kneaders such as the LIST kneader, provides the ability to handle high-viscosity polymers for developing highly filled thermoset concentrates, for example, thus increasing the throughput per unit time and allowing for a highly tunable resin stream by providing a highly concentrated "stock" resin for post formulations. For example, a 70% nanosilica filled resin may be generated using a matrix comprised of epoxy resin, and the resulting filled resin may be further mixed with a variety of diluents, pigments and other additives to develop custom formulations.

Filled resin materials made according to the present invention comprise a variety of components which will now be described.

Filled resins comprise particles dispersed in an organic matrix. Suitable particles can comprise any of a variety of materials. In some embodiments the particles comprise organic materials. In other embodiments, the particles comprise inorganic materials. Combinations of organic and inorganic materials are also contemplate. In embodiments of the invention, the particles may be selected from broad categories of inorganic materials that include without limitation metals, inorganic oxides, inorganic sulfides, inorganic antimonides, inorganic salts, inorganic nitrides, metallic particles, metal coated particles, for example. Suitable organic materials include carbon black and organic pigments, for example. Inorganic pigments may also be used.

In embodiments of the invention utilizing inorganic particles, the particles may include metal particles such as, for example, particles of gold, platinum, silver, nickel and combinations of two or more of the foregoing.

In some embodiments, organic particles such as carbon black and organic pigments are useful in the process of the invention. Inorganic pigments may also be used such as red iron oxide, yellow 763ED (Pb chromate), green Co (Al, Cr)$_2$O$_4$, sodium alumino sulphosilicate (ultramarine blue), strontium carbonate, zinc phosphate, magnesium carbonate hydroxide and combinations of two or more of the foregoing.

Inorganic oxides may be suitable for use in the process of the invention. Suitable oxides include zirconia, aluminum oxide, titanium dioxide, iron oxide, zinc oxide, silicon dioxide (silica) antimony trioxide, boron oxide, boron suboxide, bismuth(III) oxide, copper(I) oxide, copper(II) oxide, chromium(III) oxide, iron(II) oxide, iron (III) oxide, magnesium oxide, manganese(IV) oxide.

In some embodiments, suitable particles include particles of inorganic sulfides which can include without limitation copper(I) sulfide-Cu$_2$S, copper(II) sulfide-CuS and zinc sulfide —ZnS. In some embodiments, suitable particles include particles of indium phosphide, aluminum phosphide, brass, metal coated glass, boron carbide —B$_4$C, boron nitride —BN, calcium carbide —CaC$_2$, calcium hydroxide, copper (II) hydroxide, lithium hydroxide, magnesium hydroxide, aluminum, aluminum hydroxide, aluminum sulfate, calcium sulfate, cobalt(II) carbonate, copper(II) carbonate, copper(II) nitrate, copper(II) sulfate, lithium carbonate, lithium nitrate —LiNO$_3$, lithium sulfate —Li$_2$SO$_4$, magnesium carbonate —MgCO$_3$, magnesium phosphate —Mg$_3$(PO$_4$)$_2$, magnesium sulfate —MgSO$_4$, manganese(II) sulfate monohydrate —MnSO$_4$—H$_2$O, manganese(II) phosphate —Mn$_3$(PO$_4$)$_2$, nickel(II) carbonate —NiCO$_3$, nickel(II) hydroxide —Ni (OH)$_2$, nickel(II) nitrate —Ni(NO$_3$)$_2$, silicon dioxide—SiO$_2$, titanium dioxide (titanium(IV) oxide)—TiO$_2$, zinc carbonate —ZnCO$_3$, zinc oxide —ZnO, zinc sulfate —ZnSO$_4$.

Combinations of any two or more of the foregoing particulate materials are contemplated within the scope of the present invention.

In certain embodiments of the invention, the unreacted particles comprise silicon dioxide (SiO$_2$ or "silica"). Suitable silicon dioxide particles can be provided as nanoparticles or as microparticles. In some embodiments, silicon dioxide particles are solid particles (e.g., not hollow). In some embodiments, silicon dioxide particles can be provided as hollow glass microspheres. In other embodiments, silicon dioxide particles can be provided as solid (e.g., not hollow) glass beads. In some embodiments, colloidal silica is preferred. Other colloidal metal oxides can be utilized such as colloidal titania, colloidal alumina, colloidal zirconia, colloidal vanadia, colloidal chromia, colloidal iron oxide, colloidal antimony oxide, colloidal tin oxide, and mixtures of two or more of the foregoing. Suitable colloidal particles can comprise essentially a single oxide such as silica or can comprise a core of an oxide of one type over which is deposited an oxide of another type. In some embodiments, a suitable colloidal particle comprises a core of a material other than a metal oxide over which is deposited a metal oxide.

Colloidal microparticles or nanoparticles are preferably relatively uniform in size and remain substantially non-aggregated in order to avoid aggregation, precipitation, gellation, or a dramatic increase in sol viscosity. In some embodiments, a particularly desirable class of particles for use in the invention includes sols of inorganic particles (e.g., colloidal dispersions of inorganic particles in liquid media), especially sols of amorphous silica. Such sols can be prepared by a variety of techniques and in a variety of forms which include hydrosols (where water serves as the liquid medium), organosols (where organic liquids are used), and mixed sols (where the liquid medium comprises both water and an organic liquid). See, e.g., U.S. Pat. Nos. 2,801,185 (Iler) and 4,522,958 (Das et al.). See also, R. K. Iler in The Chemistry of Silica, John Wiley & Sons, New York (1979).

Suitable silica hydrosols are commercially available in a variety of particle sizes and concentrations such as those available from Ondeo Nalco Chemical Company of Naperville, Ill. under the trade designations "Nalco 2329" and "Nalco 2327." Another source of a suitable silica sol is commercially available under the trade designation "Nissan MP2040" from Nissan Chemical America Corporation of Houston, Tex. Silica hydrosols can be prepared, e.g., by partially neutralizing an aqueous solution of an alkali metal silicate with acid to a pH of about 8 or 9 (such that the resulting sodium content of the solution is less than about 1 percent by weight based on sodium oxide). Other methods of preparing silica hydrosols are known, e.g., electrodialysis, ion exchange of sodium silicate, hydrolysis of silicon compounds, and dissolution of elemental silicon.

In the present invention, a feedstock is prepared by combining particles with surface treatment agent, typically in a sol. The process of the invention provides functionalized particles that are compatible with an organic matrix material such as an organic polymer. Suitable surface treatment agents include without limitation organosilanes, organotitanates, organozirconates, organoacids, organoamines, organothiols, phosphinic acids and combinations thereof. In some embodiments, particles, surface treatment agent and solvent, and the surface functionalization reaction may take place in the mixing chamber of the kneader.

In applications where the particles comprise colloidal silicon dioxide, zirconium oxide, titanium dioxide, the concentration of particles in the sol is typically between about 60% and about 20% by weight, in some embodiments between 55% and 30% by weight, in some embodiments between about 35% and 45% by weight.

Additionally, mixtures of particles that differ in particle size may be functionalized and incorporated into a single resin according to the invention. Examples of some suitable combinations of particle sizes include mixtures of particles having a thickness of about 20 nm with other larger particles such as those having a thickness of about 142 nm. Additionally, 20 nm particles may be combined with 200 nm particles, and 20 nm particles with 500 nm particles. Suitable weight ratios of the foregoing combined particle sizes can be within a wide range, in some embodiments between 1/20 and 20/1.

In embodiments of the invention, reactive groups (e.g., hydroxyl groups) on the surface of the particles are utilized to interact with surface treatment agent(s) to form functionalized particles. In certain embodiments, reactive groups (e.g., hydroxyl groups) on the surface of the particles covalently bond with surface treatment agent(s). In some embodiments, reactive groups on the surface of the particles ionically bond with surface treatment agent(s).

In embodiments of the invention utilizing oxide particles (e.g., silicon dioxide, titanium dioxide, zirconium dioxide, etc. . . . ), suitable surface treatment agents include those that are reactive with the hydroxyl groups along the surface of the particles. In some embodiments, suitable surface treatment agents include organosilanes. In some embodiments, suitable organosilanes include one organic substituent and three hydrolysable substituents. Exemplary organosilanes include: [2-(3-cyclohexenyl)ethyl]trimethoxysilane, trimethoxy(7-octen-1-yl) silane, isooctyl trimethoxy-silane, N-(3-triethoxysilylpropyl)methoxyethoxyethoxyethyl carbamate, N-(3-triethoxysilylpropyl)methoxyethoxyethoxyethyl carbamate, 3-(methacryloyloxy)propyltrimethoxysilane, allyl trimethoxysilane, 3-acryloxypropyltrimethoxysilane, 3-(methacryloyloxy)-propyltriethoxysilane, 3-(methacryloyloxy) propylmethyldimethoxysilane, 3-acryloyloxypropyl)methyldimethoxysilane, -9-3-(methacryloyloxy)propyl-dimethylethoxysilane, 3-(methacryloyloxy)propyldimethylethoxysilane, vinyldimethylethoxysilane, phenyltrimethoxysilane, n-octyltrimethoxysilane, dodecyltrimethoxysilane, isooctyltrimethoxysilane octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-tbutoxysilane, vinyltris-isobutoxysilane, vinyltriisopropenoxysilane, vinyltris(2-methoxyethoxy)silane, styrylethyltrimethoxysilane, mercaptopropyltrimethoxysilane, 3-glycidoxypropyltrimethoxysilane, heptamethyl(2-[tris(2-methoxyethoxy)-silyl]ethyl)trisiloxane (e.g., as described in U.S. 2003/0220204 A1), polydimethylsiloxane, arylsilanes, including, e.g., substituted and unsubstituted arylsilanes, alkylsilanes, including, e.g., substituted and unsubstituted alkyl silanes, including, e.g., methoxy and hydroxy substituted alkyl silanes, and combinations of two or more of the foregoing.

Suitable surface treatments for silica particle inclusion in polyurethane environments can be produced by reaction of suitable difunctional or trifunctional polyols with 3-triethoxysilyl propyl isocyanate, resulting in urethane linkages. Suitable polyols include polyethylene glycol, polypropylene glycol, polycaprolactone polyol (Tone 2221, available from Dow Chemical, Midland Mich.), hydroxyl-terminated polybutadienes and poly(tetramethylene ether) glycol.

Other surface treatment agents suitable for use with oxide particles include acrylic acid, methacrylic acid, oleic acid, stearic acid, dodecanoic acid, 2-[2-(2-methoxyethoxy)-ethoxy]acetic acid (MEEAA), betacarboxyethylacrylate, 2-(2-methoxyethoxy)acetic acid, methoxyphenyl acetic acid, and combinations of two or more of the foregoing. In some embodiments, a proprietary silane surface modifier identified by the trade name "Silquest A1230" (commercially available from Momentive Specialties of Wilton, Conn.), may be used.

In some embodiments, suitable surface treatment agents include alkyl amines and/or aryl amines. In certain embodiments, surface treatment agents comprising $C_1$-$C_{30}$ alkyl and aryl amines may be used, particularly polyethylene glycol-functional amines (e.g., jeffamine materials), stearyl amine, behenyl amine, and combinations thereof. In other embodiments, suitable surface treatment agents include those comprising thiols and, in particular, $C_1$-$C_{30}$ alkyl and aryl thiols. In other embodiments, surface treatment agents comprising carboxylic acids may be desired, particularly those comprising $C_1$-$C_{30}$ alkyl and aryl carboxylic acids. In still other embodiments, surface treatment agents comprising phosphinic acids may be desired, particularly those comprising $C_1$-$C_{30}$ alkyl and aryl phosphinic acids.

In embodiments wherein water is used as the principal solvent, organic co-solvent may optionally be added to the sol to facilitate the solubility of the surface treatment agent as well as the functionalized particles. Suitable co-solvents comprise any of a variety of water miscible organic solvents. In some embodiments, co-solvent(s) may be selected from the group that includes, for example, 1-methoxy-2-propanol, ethanol, isopropanol, ethylene glycol, N,N-dimethylacetamide, ethyl acetate, and/or 1-methyl-2-pyrrolidinone, dimethyl formamide, diethylene glycol dimethyl ether (diglyme), methanol, methoxy(ethoxy(ethoxy))ethanol as well as mixtures of two or more of the foregoing.

Carbonaceous particles such as carbon black may be surface treated in solvents such as toluene, benzene or ethyl benzene. In some embodiments, particle concentrations for such carbonaceous particles is within the range from about 5% to about 25 wt % with surface treatment loadings from about 0.05% to about 0.1 wt %. In some embodiments, surface treatment agents are selected from zirconates, titanates and organic aryl/alkylamines as well as combinations thereof.

Once prepared, the feedstock solution may be passed through a continuous hydrothermal reactor such as that shown in FIG. 1 and described herein. However, other designs of a continuous hydrothermal reactor designs can be used. For example, some suitable continuous hydrothermal reactors are described in an article by Adschiri et al., *J. Am. Ceram. Soc.,* 75 (4), 1019-1022 (1992) and in U.S. Pat. No. 5,453,262 (Dawson et al). In these designs, the portion of the continuous hydrothermal reactor system that is heated includes a tube that is straight and that has a surrounding electrical-resistance heater.

The foregoing particles are combined with an organic matrix to provide a filled resin. In some embodiments, the organic matrix is a viscous liquid or semi-solid material which is capable of being hardened and comprising at least one polymer, oligomer and/or monomer. In some embodiments, hardening of the organic matrix includes a polymerization step in which the polymer, oligomer and/or monomer undergoes a polymerization reaction to provide a hardened organic matrix. Suitable polymers include thermosetting polymers, thermoplastic polymers, elastomers, and the like.

In some embodiments, the organic matrix is an ethylenically-unsaturated crosslinkable resin such as, for example, unsaturated polyester, vinyl esters, and acrylates (e.g., urethane acrylates). As used herein, "vinyl ester" refers to the reaction product of epoxy resin(s) with ethylenically-unsaturated monocarboxylic acid(s). Although such reaction products are acrylic or methacrylic esters, the term "vinyl ester" is used consistently in the gel coat industry. (See, e.g., Handbook of Thermoset Plastics (Second Edition), William Andrew Publishing, page 122 (1998)).

The resin may be present in the organic matrix as monomer(s) and/or prepolymer(s) (e.g., oligomer). Initially, the molecular weight of the resin is sufficiently low so as to be soluble in a reactive diluent. In some embodiments, an unsaturated polyester resin may be used. In some embodiments, the unsaturated polyester resin is the condensation product of one or more carboxylic acids or derivatives thereof (e.g., anhydrides and esters) with one or more alcohols.

In some embodiments, useful carboxylic acids may be unsaturated. In some embodiments, one or more of the carboxylic acids may be saturated. In some embodiments, one or more of the carboxylic acids may be aromatic carboxylic acid. In some embodiments, combinations of saturated, unsaturated and/or aromatic carboxylic acid(s) may be used. Suitable unsaturated carboxylic acids include acrylic acid, chloromaleic acid, citraconic acid, fumaric acid, itaconic acid, maleic acid, mesaconic acid, methacrylic acid, methyleneglutaric acid and combinations of two or more of the foregoing. Exemplary saturated or aromatic carboxylic acids include adipic acid, benzoic acid, chlorendic acid, dihydrophthalic acid, dimethyl-2,6-naphthenic dicarboxylic acid, d-methylglutaric acid, dodecanedicarboxylic acid, ethylhexanoic acid, glutaric acid, hexahydrophthalic acid, isophthalic acid, nadic anhydride o-phthalic acid, phthalic acid, pimelic acid, propionic acid, sebacic acid, succinic acid, terephthalic acid, tetrachlorophthalic acid, tetrahydrophthalic acid, trimellitic acid, 1,2,4,5-benzene-tetracarboxylic acid, 1,2,4-benzenetricarboxylic acid, 1,2-cyclohexane dicarboxylic acid, 1,3 cyclohexane dicarboxylic acid, 1,4-cyclohexane dicarboxylic acid, dicyclopentadiene acid maleate, Diels-Alder adducts made from maleic anhydride and cyclopentadiene, orthophthalic acid and combinations of two or more of the foregoing.

In some embodiments, the alcohol is a polyhydric alcohol, e.g., a dihydric alcohol. Exemplary polyhydric alcohols include alkanediols, butane-1,4-diol, cyclohexane-1,2-diol, cyclohexane dimethanol, diethyleneglycol, dipentaerythritol, di-trimethylolpropane, ethylene glycol, hexane-1,6-diol, neopentyl glycol, oxa-alkanediols, polyethyleneglycol, propane-3-diol, propylene glycol, triethyleneglycol, trimethylolpropane, tripentaerythirol, 1,2-propyleneglycol, 1,3-butyleneglycol, 2-methyl-1,3-propanediol, 2,2,4-trimethyl-1-3,-pentanediol, 2,2-bis(p-hydroxycyclohexyl)-propane, 2,2-dimethylheptanediol, 2,2-dimethyloctanediol, 2,2-dimethylpropane-1,3-diol, 2,3-norborene diol, 2-butyl-2-ethyl-1,3-propanediol, 5-norborene-2,2-dimethylol, and 2,3 dimethyl 1,4 butanediol. Monofunctional alcohols may also be used. Exemplary monofunctional alcohols include benzyl alcohol, cyclohexanol, 2-ethylhexyl alcohol, 2-cyclohexyl alcohol, 2,2-dimethyl-1-propanol, and lauryl alcohol. Combinations of two or more of the foregoing are also contemplated.

In some embodiments, the carboxylic acid is selected from the group consisting of isophthalic acid, orthophthalic acid, maleic acid, fumaric acid, esters and anhydrides thereof, and combinations thereof. In some embodiments, the alcohol is selected from the group consisting of neopentyl glycol, propylene glycol, ethylene glycol, diethylene glycol, 2-methyl-1,3-propane diol, and combinations thereof.

Other suitable resins include epoxy resins, curable imide resins such as maleimide resins, but also including, e.g., commercial K-3 polyimides (available from DuPont) and polyimides having a terminal reactive group such as acetylene, diacetylene, phenylethynyl, norbornene, nadimide, or benzocyclobutane. Other suitable resins include vinyl ester resins and acrylic resins (e.g., (meth)acrylic esters or amides of polyols, epoxies, and amines), bisbenzocyclobutane resins, polycyanate ester resins, and mixtures thereof. The resins can be utilized in the form of either monomers or prepolymers.

Epoxy resins may be useful due to their processing characteristics, high temperature properties, and environmental resistance. Epoxy compounds can be saturated or unsaturated, aliphatic, alicylic, aromatic, or heterocyclic, or can comprise combinations thereof. In some embodiments, useful compounds include those containing more than one epoxy group (i.e., polyepoxides) and include both aliphatic and aromatic polyepoxides containing at least one aromatic ring structure, e.g. a benzene ring, and more than one epoxy group. Suitable aromatic polyepoxides include the polyglycidyl ethers of polyhydric phenols (e.g., bisphenol A derivative resins, epoxy cresol-novolac resins, bisphenol F derivative resins, epoxy phenol-novolac resins), glycidyl esters of aromatic carboxylic acids, and glycidyl amines of aromatic amines. Polyglycidyl ethers of polyhydric phenols are commercially available such as bisphenol A diglycidyl ether available under the trade designation "EPON 828," commercially available from Miller-Stephenson Products of Danbury, Conn.

Useful aliphatic polyepoxides include 3',4'-epoxycyclohexylmethyl-3,4-epoxycyclohexanecarboxylate, 3,4-epoxycyclohexyloxirane, 2-(3',4'-epoxycyclohexyl)-5,1"-spiro-3", 4"-epoxycyclohexane-1,3-dioxane, bis(3,4-epoxycyclohexylmethyl)adipate, the diglycidyl ester of linoleic dimer acid, 1,4-bis(2,3-epoxypropoxy)butane, 4-(1, 2-epoxyethyl)-1,2-epoxycyclohexane, 2,2-bis(3,4-epoxycyclohexyl)propane, polyglycidyl ethers of aliphatic polyols such as glycerol or hydrogenated 4,4'-dihydroxydiphenyl-dimethylmethane, and mixtures thereof.

Useful aromatic polyepoxides include glycidyl esters of aromatic carboxylic acids, e.g., phthalic acid diglycidyl ester, isophthalic acid diglycidyl ester, trimellitic acid triglycidyl ester, and pyromellitic acid tetraglycidyl ester, and mixtures thereof; N-glycidylaminobenzenes, e.g., N,N-diglycidylbenzeneamine, bis(N,N-diglycidyl-4-aminophenyl)methane, 1,3-bis(N,N-diglycidylamino)benzene, and N,N-diglycidyl-4-glycidyloxybenzeneamine, and mixtures thereof; and the polyglycidyl derivatives of polyhydric phenols, e.g., 2,2-bis-[4-(2,3-epoxypropoxy)phenyl]propane, the polyglycidyl ethers of polyhydric phenols such as tetrakis(4-hydroxyphenyl)ethane, pyrocatechol, resorcinol, hydroquinone, 4,4'-dihydroxydiphenyl methane, 4,4'-dihydroxydiphenyl dimethyl methane, 4,4'-dihydroxy-3,3'-dimethyldiphenyl methane, 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl sulfone, and tris-(4-hydroxyphenyl)methane, polyglycidyl ethers of novolacs (reaction products of monohydric or polyhydric phenols with aldehydes in the presence of acid catalysts), and the derivatives described in U.S. Pat. Nos. 3,018,262 (Schoeder) and 3,298,998 (Coover et al.), as well as the derivatives described in the Handbook of Epoxy Resins by Lee and Neville, McGraw-Hill Book Co., New York (1967) and in Epoxy Resins, Chemistry and Technology, Second Edition, edited by C. May, Marcel Dekker, Inc., New York (1988), and mixtures thereof. A suitable class of polyglycidyl ethers of polyhydric phenols are the diglycidyl ethers of bisphenol that have pendant carbocyclic groups, e.g., those described in U.S. Pat. No. 3,298,998 (Coover et al.). Examples of such compounds include 2,2-bis[4-(2,3-epoxypropoxy)phenyl]norcamphane, 2,2-bis[4-(2,3-epoxypropoxy)phenyl]decahydro-1,4,5,8-dimethanonaphthalene and 9,9-bis[4-(2,3-epoxypropoxy)phenyl]fluorene.

Suitable epoxy resins can be prepared by, e.g., the reaction of epichlorohydrin with a polyol, as described, e.g., in U.S. Pat. No. 4,522,958 (Das et al.), as well as by other methods described by Lee and Neville and by May, supra.

Suitable maleimide resins include bismaleimides, polymaleimides, and polyaminobismaleimides. Such maleimides can be conveniently synthesized by combining maleic anhydride or substituted maleic anhydrides with di- or polyamine(s). Preferred are N,N'-bismaleimides, which can be prepared, e.g., by the methods described in U.S. Pat. Nos. 3,562,223 (Bargain et al.), 3,627,780 (Bonnard et al.), 3,839,358 (Bargain), and 4,468,497 (Beckley et al.). Representative examples of suitable N,N'-bismaleimides include the N,N'-bismaleimides of 1,2-ethanediamine, 1,6-hexanediamine, trimethyl-1,6-hexanediamine, 1,4-benzenediamine, 4,4'-methylenebisbenzenamine, 2-methyl-1,4-benzenediamine, 3,3'-methylenebisbenzenamine, 3,3'-sulfonylbisbenzenamine, 4,4'-sulfonylbisbenzenamine, 3,3'-oxybisbenzenamine, 4,4'-oxybisbenzenamine, 4,4'-methylenebiscyclohexanamine, 1,3-benzenedimethanamine, 1,4-benzenedimethanamine, 4,4'-cyclohexanebisbenzenamine, and mixtures thereof.

Co-reactants for use with the bismaleimides can include any of a variety of unsaturated organic compounds, particularly those having multiple unsaturation, either ethylenic, acetylenic, or both. Examples include acrylic acids and amides and the ester derivatives thereof, e.g, acrylic acid, methacrylic acid, acrylamide, methacrylamide, and methylmethacrylate; dicyanoethylene; tetracyanoethylene; allyl alcohol; 2,2'-diallylbisphenol A; 2,2'-dipropenylbisphenol A; diallylphthalate; triallylisocyanurate; triallylcyanurate; N-vinyl-2-pyrrolidinone; N-vinyl caprolactam; ethylene glycol dimethacrylate; diethylene glycol dimethacrylate; trimethylolpropane triacrylate; trimethylolpropane trimethacrylate; pentaerythritol tetramethacrylate; 4-allyl-2-methoxyphenol; triallyl trimellitate; divinyl benzene; dicyclopentadienyl acrylate; dicyclopentadienyloxyethyl acrylate; 1,4-butanediol divinyl ether; 1,4-dihydroxy-2-butene; styrene; a-methyl styrene; chlorostyrene; p-phenylstyrene; p-methylstyrene; t-butylstyrene; and phenyl vinyl ether. Resin systems employing a bismaleimide in combination with a bis(alkenylphenol) are useful, and descriptions of resin systems of this type are found in U.S. Pat. No. 4,100,140 (Zahir et al.). Suitable components include 4,4'-bismaleimidodiphenylmethane and o,o'-diallyl bisphenol A, for example.

Suitable polycyanate ester resins can be prepared by combining cyanogen chloride or bromide with an alcohol or phenol. The preparation of such resins and their use in polycyclotrimerization to produce polycyanurates are described in U.S. Pat. No. 4,157,360 (Chung et al.). Representative examples of polycyanate ester resins include 1,2-dicyanatobenzene, 1,3-dicyanatobenzene, 1,4-dicyanatobenzene, 2,2'-dicyanatodiphenylmethane, 3,3'-dicyanatodiphenylmethane, 4,4'-dicyanatodiphenylmethane, and the dicyanates prepared from biphenol A, bisphenol F, and bisphenol S. Trifunctional and higher functionality cyanate resins are also suitable.

Generally, the resin is both soluble in a reactive diluent and reacts with the reactive diluent to form a copolymerized network. Generally, any known reactive diluent may be used including, without limitation, styrene, alpha-methylstyrene, vinyl toluene, divinylbenzene, methyl methacrylate, diallyl phthalate, ethylene glycol dimethacrylate, hydroxyethyl methacrylate, hydroxyethyl acrylate and triallyl cyanurate.

Thermally-activated catalytic agents, e.g., Lewis acids and bases, tertiary amines, imidazoles, complexed Lewis acids, and organometallic compounds and salts, can be utilized in curing epoxy resins. Thermally-activated catalysts can generally be used in amounts ranging from about 0.05 to about 5 percent by weight, based on the amount of epoxy resin present in the curable resin composition.

N,N'-bismaleimide resins can be cured using diamine curing agents, such as those described in U.S. Pat. No. 3,562,223 (Bargain et al.). Generally, from about 0.2 to about 0.8 moles of diamine can be used per mole of N,N'-bismaleimide. N,N'-bismaleimides can also cure by other mechanisms, e.g., cocure with aromatic olefins (such as bis-allylphenyl ether, 4,4'-bis(o-propenylphenoxy)benzophenone, or o,o'-diallyl bisphenol A) or thermal cure via a self-polymerization mechanism.

Polycyanate resins can be cyclotrimerized by application of heat and/or by using catalysts such as zinc octoate, tin octoate, zinc stearate, tin stearate, copper acetylacetonate, and chelates of iron, cobalt, zinc, copper, manganese, and titanium with bidentate ligands such as catechol. Such catalysts can generally be used in amounts of from about 0.001 to about 10 parts by weight per 100 parts of polycyanate ester resin.

The filled resin of the invention can be used to make articles by a variety of conventional processes, e.g., resin transfer molding, filament winding, tow placement, resin infusion processes, or traditional prepreg processes. Prepregs can be prepared by impregnating an array of fibers (or a fabric) with the filled resin (or with a volatile organic liquid-containing resin sol) and then layering the impregnated tape or fabric. The resulting prepreg can then be hardened or cured by application of heat, along with the application of pressure or vacuum (or both) to remove any trapped air. In other embodiments, the filled resins are hardened or cured by exposure to radiation, i.e., ultraviolet, e-beam, or the like.

EXAMPLES

Embodiments of the invention will be further described in the non-limiting examples that follow.

Analytical Methods
Analysis of Rheology:

Rheometric analysis of nanocomposite samples was conducted on an Ares Rheometric Scientific (TA instruments, New Castle, Del.) rheometer in Couvette mode.

Examination by Transmission Electron Microscopy (TEM):

A Hitachi H-9000 transmission electron microscope was used to examine prepared samples. Samples for TEM observation were microtomed at room temperature. All samples were cut at the thickness of 87 nm so that a direct comparison could be made between the different % particle loadings.

Analysis of Solvent Residuals by Gas Chromatography (GC):

Solvent residuals were determined by GC analysis using duplicate dilutions for each sample. Known masses of each sample, in the region of 120-180 mg of sample were brought to a volume of 10 mL with chloroform. Reference standards were created in chloroform for the concentration range of 0.1-1000 µg/mL. Samples and reference standards were aliquoted into vials via 0.2 µm PVDF syringe filters and analyzed according to the conditions below:

GC Instrument: Agilent 6890 GC, HP 7683 Injector
Column: Innowax 30 m×0.32 mm 1.0 um
Flow: 3.5 mL/min helium at constant flow
Injection: 1 µL split 1/60 [280° C.]
Oven: 60° C. @ 20° C./min to 300° C., hold 2 min
Detection flame ionization [300° C.].

Karl Fischer Analysis:

Moisture was measured using a Metrohm 756 Coulomat® with Aquastar® A and Aquastar® C reagents. Each sample was run in duplicate. Approximately 300 mg of the epoxy materials were weighed into dry glass vials to an accuracy of +/−0.0001 g. The samples were then diluted with 1 mL of anhydrous chloroform and re-weighed. The vials were capped and the samples were shaken for 15 minutes to dissolve the material. The samples were then diluted with 3 mL of anhydrous methanol and re-weighed. The vials were then shaken for 60 minutes to give a milky suspension. Aliquots were then drawn from the vials via syringe and weighed to an accuracy of +/−0.0001 g. The aliquots were then submitted to the Karl Fischer titration. Three aliquots were drawn from each vial to give a total of six titrations for each of the two samples. Chloroform/methanol blanks were also run to determine the background level of water in the solvent.

General Procedure for Determining Fracture Toughness

Fracture toughness ($K_{1C}$) was measured according to ASTM D 5045-99, except that a modified loading rate of 0.13 cm/minute (0.050 inches/minute) was used. A compact tension geometry was used, wherein the specimens had nominal dimensions of 3.18 cm by 3.05 cm by 0.64 cm. The following parameters were employed: W=2.54 cm; a=1.27 cm; B=0.64 cm. Measurements were made on between 6 and 10 samples for each resin tested. Average values for $K_{1C}$ were reported in units of MPa($m^{1/2}$). Only those samples meeting the validity requirements of ASTM D 5045-99 were used in the calculations.

Equipment and Procedures for Devolatilization
Devolatilization Procedure 1:

A LIST CRP 2.5 batch kneader (manufactured volatile by LIST USA Inc. Charlotte, N.C.) was used in kneading particles and organic matrix. The kneader had a total volume capacity of 3 liters, constructed from 316 Titanium. The CRP 2.5 has a length of 24.6 cm and diameter of 10.6 cm, possessing a horizontal, double flight, twin screw mixing design. The concave screw design has dimensions of 3.4 cm outer diameter, a core diameter of 1.6 cm, with a pitch in the inlet section of 3.0 cm, and a pitch in the transport section 2.3 cm. The length of the transport section is 31.5 cm. Heat was applied to the kneader through use of a 18 kW Sterlco Oil Heater, model #G9816-JO, (obtained from Sterling, New Berlin, Wis.). Vacuum is supplied through use of a single stage, rotary vane vacuum pump, model #RA-0040E506-1001, (obtained from Busch LLC, Virginia Beach, Va.).

Devolitilization Procedure 2:

Continuous synthesis reactions are performed in a LIST Discotherm B6 High Viscosity Processor, (commercially available from List AG, Acton, Mass.). The reactor has a total length of about 13.8 cm and an inside diameter of 2.8 cm consisting of a horizontal, cylindrical housing, and comprising 3 zones. Located in the center of the housing is a concentric main screw agitator shaft, having a diameter of about 6.35 cm. Mounted on the shaft (and extending perpendicular to the shaft) are disk elements with angled peripheral mixing-kneading bars (extending generally parallel to the shaft). Stationary hook-shaped bars mounted on the inside of the housing interact with and clean the shaft and disk elements as they rotate. The arrangement of the disk elements and mixing-kneading bars in concert with the stationary hook-shaped bars impart a substantially forward plug-flow movement to the material with minimal axial intermixing. (The plug flow nature of the reactor is quantified by using a dough-like product injected with a tracer to obtain a residence time distribution curve. The curve is plotted against a theoretical curve for 14 ideal continuous stirred tank reactors in series. The data fit the theoretical curve well, indicating plug-flow behavior.) Material is discharged from the LIST by a twin-screw discharge screw. The total volume in the reactor is 17.5 L, with a working volume of 12 L. The housing, shaft, and disk elements are heated via a hot oil heating system. The heat transfer area in the reactor is 0.67 m. Temperature is controlled and monitored in three locations within the reactor: (1) the reactor entrance zone (temperature $T_1$), (2) the reactor intermediate zone (temperature $T_2$) and (3) the reactor exit zone (temperature $T_3$). A variable speed motor drives the agitator shaft at speeds of 5 to 70 rpm and a maximum torque of 885 ft lbs (1200 Nm). A vacuum pump is attached to the reactor for vapor removal. The condensate is collected in two evacuated, high vacuum, glass solvent traps submerged in a slurry bath consisting of a suitable coolant, typically ISOPAR isoparaffin ($C_{18-25}$) hydrocarbons available from Exxon Company USA, Houston, Tex. and dry ice ($CO_2$).

Materials

Materials used in the preparation of samples are identified in Table 1.

TABLE 1

| MATERIAL | DESCRIPTION |
| --- | --- |
| EPON 828 | A difunctional bisphenol A/epichlorohydrin derived liquid epoxy resin available from Hexion Specialty Chemicals, Houston, Texas |
| Jeffco 1401-21 Resin/ Jeffco 4101-21 Fast Hardener | A multifunctional epoxy and cycloaliphatic-amine blend hardener for high performance composite parts available from Jeffco Products, San Diego, CA. |

TABLE 1-continued

| MATERIAL | DESCRIPTION |
| --- | --- |
| Nalco 2329 | A 41% solids by weight, aqueous, silica sol with an approximate particle size of 98 nm, available from Ondeo Nalco Chemical Company of Naperville, Ill. |
| Nalco 2327 | A 41% solids by weight, aqueous, silica sol with an approximate particle size of 20 nm, available from Ondeo Nalco Chemical Company of Naperville, Ill. |
| PhTMS | Phenyltrimethoxysilane available from Alfa Aesar Ward Hill, MA. |
| Silaquest A-1230 | Polyalkylene oxide alkoxysilane available from Momentive, Friendly, WV. |
| 1-Methoxy-2-propanol (MP) | 1-methoxy-2-propanol available from Aldrich Chemicals, Milwaukee, WI. |
| Organosol 1 | A 25 wt % solution of phenyltrimethoxysilane/Silaquest A-1230 modified Nalco 2329 (ca. 98 nm) in 50/50 wt % methoxypropanol/water. The molar ratio of phenyltrimethoxysilane to Silaquest A-1230 is 3:1. |
| Organosol 2 | A 25 wt % solution of phenyltrimethoxysilane/Silaquest A-1230 modified Nalco 2327 (ca. 20 nm) in 50/50 wt % methoxypropanol/water. The molar ratio of phenyltrimethoxysilane to Silaquest A-1230 is 3:1. |
| Organosol 3 | A 50 wt % solution of A-174/Silaquest A-1230 modified Nalco 2329 (ca. 98 nm) in 50/50 wt % methoxypropanol/water. The molar ratio of A-174 to A-1230 is 1:1. |
| Organosol 4 | A 50 wt % solution of $PhSi(OMe)_3$-modified Nalco 2329 (ca. 98 nm) in 50/50 wt % methoxypropanol/water. |
| Roskydal (UPR) | Roskydal TP LS 2190 is an non-air-inhibited, monomer free, unsaturated polyester resin (UPR) available commercially from Bayer Material Science, Pittsburgh PA. |
| 4-Hydroxy-TEMPO | 4-hydroxy-TEMPO, free radical 98%+ is a free radical scavenger available commercially from Alfa Aesar, Ward Hill MA. |
| Cobalt Naphthenate solution | A 6 wt. % solution of cobalt naphthenate, available from Mini-Craft of Florida, Incorporated, Wildwood, Florida. |
| MEKP | methylethylketone peroxide, available as 2-butanone peroxide, ca. 35 wt. % solution in 2,2,4-trimethyl-1,3-pentanediol diisobutyrate, from Sigma-Aldrich Chemical Company, Milwaukee, Wisconsin. |
| HK (UPR) | HK Translucent Gelcoat Base is a blend of unsaturated polyester (UPR)/styrene available from HK Research Hickory, NC |
| EPON 825 | EPON ™ Resin 825 is a high purity, bisphenol A epichlorohydrin epoxy resin commercially available from Hexion Specialty Chemicals, Inc., Houston, TX. |
| A-174 | Silquest A-174, 3-methacryloxypropyltrimethoxysilane available from Momentive, Friendly, WV. |
| A-1230 | Silquest A-1230, a polyethylene glycol(trimethoxy)silane available from Momentive, Friendly, WV |
| Styrene | Styrene monomer commercially available from Sigma-Aldrich Chemical Company, Milwaukee, Wisconsin. |
| MMA | Methyl methacrylate monomer, commercially available from Sigma-Aldrich Chemical Company, Milwaukee, Wisconsin. |
| JAS | Jeffamine Sulfate, the reaction product of JEFFAMINE M-600 Polyetheramine with Propane sulfone as described in U.S. Provisional patent application Ser. No. 61/139145 (attorney docket no. 64990US002), |
| JEFFAMINE M-600 Polyetheramine | A 600 molecular weight polypropylene glycol monoamine, with methoxyethyl termination at the other end. available from Huntsman Corporation, The Woodlands, Texas |
| Ethacure 100 | A liquid aromatic amine, commercially available from Albemarle, Baton Rouge, LA. |
| Socal 31 | Ultrafine, precipitated calcium carbonate commercially available from Solvay Advanced Functional Minerals, Rheinberg, Germany |
| Nalco 2326 sol | A 45% solids by weight, aqueous, silica sol with an approximate particle size of 5 nm, available from Ondeo Chemical Company of Naperville, Ill. |
| propylene elastomer | "Engage" 8401 resin available from Dow Chemical, Midland, Michigan. |

Comparative Example A

A mixture of silica sol, silanes and methoxy propanol was mixed at 95° C. for 22 hours in standard laboratory equipment. The resultant surface—treated silica sol was compounded into appropriate resin systems by solvent exchange and vacuum stripping of solvents according to methods described in U.S. Pat. No. 5,648,407 (Goetz et al.). High degrees of surface functionalization were confirmed by dispersing the particles into appropriate epoxy resins and achieving relatively low viscosity liquids. Stripping was performed on a rotary evaporator. Formulation details of these nanocomposites are shown in Table 2.

TABLE 2

| Sample | Sol (particle size) | Surface Treatment (ratio) | Resin | % Solids |
| --- | --- | --- | --- | --- |
| C. Ex. A | Nalco 2329 (98 nm) | PhTMS/A-1230 (3:1) | Jeffco 1401 | 40 |

Examples 1-10

Formulations, process conditions and analytical results for Examples 1-10 are shown in Table 3. The mixtures of surface modified silica nanoparticles in 50/50 wt % water/methoxypropanol and resin for Examples 1-10 were premixed and vacuum fed according to the Devolatilization Procedure 1 to the LIST CRP 2.5 kneader which was heated and maintained under 1 mm Hg vacuum. Each resulting dispersion was concentrated under vacuum with kneading at 40 rpm over a period of 15-30 min. The contents of the kneader were emptied and analyzed rheologically according to the Procedure for Analysis of Rheology. Levels of residual solvent and water were determined according to the method for Analysis of Solvent Residuals by Gas Chromatography (GC) and by Karl Fischer Analysis. Thermogravimetric analysis (TGA) was used to determine the concentration of nanosilica in resin.

For Example 8, TEM was performed on ground samples of the uncured epoxy powder. Examples 9 and 10 were formulated with UPR and surface modified silica sols were pre-concentrated to between 50 and 65 wt % silica through use of a rotary evaporator prior to delivery to the kneader in order to shorten the amount of time needed to devolitilize these solutions and to limit thermal degradation of the UPR in the high temperature environment.

To probe dispersion by TEM analysis, samples of each of Examples 1-10 were cured by addition of appropriate comonomers and curing agents (see Table 3). For epoxy systems, cured samples were made by adding Jeffco 4101-21 hardener to the epoxy resin sol into a wide-mouth plastic container with a lid. The container was sealed and the contents were mixed at 2000 rpm for 30 seconds using a Speed-Mixer dual asymmetric centrifuge (Model DAC 600 FVZ-sp, available from Flack Tek, Incorporated, Landrum, S.C.). After mixing the nanoparticle-containing mixture was transferred to a float glass mold treated with Frekote 44NC release material (Henkel Corporation, Rocky Hill, Conn.). The sample was allowed to cure at 120° C. for 1.5 hours and then post cured at 150° C. for 2 hours.

UPR—containing systems were prepared by placing the nanoparticle-containing mixture of UPR, styrene and 1.25% (weight) cobalt napthenate in a wide-mouth plastic container with lid. The container was sealed and the contents were mixed at 2000 rpm for 30 seconds using a SpeedMixer dual asymmetric centrifuge (Model DAC 600 FVZ-sp, available from Flack Tek, Incorporated, Landrum, S.C.). 1.0% by weight of methylethylketone peroxide (MEKP) solution (ca. 35 wt. % solution) was added. The container was re-sealed and the contents mixed at 2000 rpm for 30 seconds using the SpeedMixer centrifuge. The resulting nanoparticle-containing gel coat was transferred to a float glass mold treated with VALSPAR MR 225 release material. The sample was then allowed to cure at room temperature for 24 hours and then was postcured at 70° C. for 4 hours.

Samples of epoxy nanocomposites were cured and examined by TEM. Samples of UPR nanocomposites were formulated with additional styrene and methyl methacrylate to produce 40 wt % silica loadings and were cured and examined by TEM. The formulations details of these UPR experiments can be found in Table 3.

TABLE 3

| EX | Resin (g) | Sol (g) | Process Variables (Temp. (° C.)/ Time (min)/ Vacuum (torr)/RPM) | Wt % H₂O | Wt % MP | Wt % NP in Resin | Resin/NP Cured (g) | Curative (g) | Styrene/MMA (g) |
|---|---|---|---|---|---|---|---|---|---|
| 1 | Jeffco 1401 (700) | 1868[a] | 150/30/40/40 | 0.08 | 0.02 | 40 | 52.0 | Jeffco 4101-21 10. | |
| 2 | EPON 828 (700) | 5867[a] | 150/30/40/40 | 0.05 | 0.20 | 40 | 52.3 | Jeffco 4101-21 10.1 | |
| 3 | EPON 828 (500) | 2000[a] | 150/30/50/40 | 0.02 | 0.20 | 50 | 109.3 | Jeffco 4101-21 (16.4) | |
| 4 | EPON 828 (700) | 4200[a] | 150/30/60/40 | 0.22 | 0.4 | 60 | 53.0 | Jeffco 4101-21 (7.3) | |
| 5 | Jeffco 1401 (500) | 4665[a] | 150/15/70/40 | 0.02 | 0.19 | 70 | 53.8 | Jeffco 4101-21 (6.8) | |
| 6 | Jeffco 1401 (809) | 4665[a] | 150/30/59/40 | 0.02 | 0.18 | 59 | 3.0 | Jeffco 4101-21 (0.3) | |
| 7 | EPON 825 (500) | 2000[b] | 150/30/50/40 | 0.05 | 0.02 | 50 | NA | NA | |
| 8 | EPON 825 (400) | 1600[d] | 150/30/40/25 | 0.00 | 0.02 | 80 | NA | NA | |
| 9 | Roskydahl (1000) | 8089[c] | 135/30/40/25 | 0.02 | 0.12 | 67 | 59.7 | NA | 40/0 |
| 10 | HK (1000) | 2673[c] | 135/30/40/25 | 0 | 0.5 | 54 | 73.3 | NA | 23.5/3.2 |

[a]Organosol 1
[b]Organosol 2
[c]Organosol 3
[d]Organosol 4

TEM examination of the filled materials revealed them to be well-dispersed in that no large scale agglomeration was observed as the % solids increased. In the case of Example 8 with nanoparticle loading levels of 80 wt % in EPON 825 resin and resulted in the formation of a powdered product.

Example 9, after addition of styrene, was cured and was submitted for dispersion analysis. TEM confirmed that the cured materials generated from Example 9 were highly dispersed.

Example 1 and Comparative Example A

Figure 2:
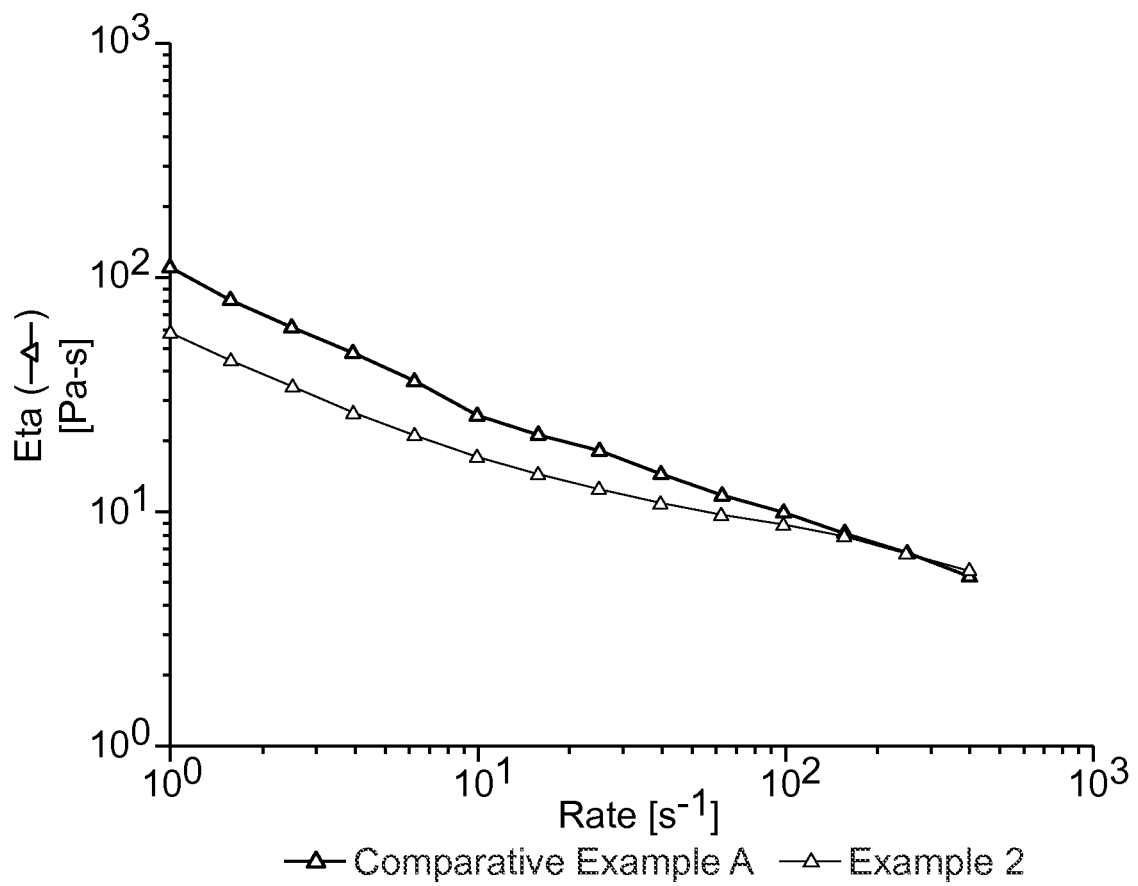
FIG. 2 is a plot of viscosity as a function of shear rate for materials made according to Comparative Example A and Example 1 herein.

Samples of Example 1 and Comparative Example A were examined according to the above procedure—Analysis of Rheology, analyzing the respective changes in viscosity as a function of frequency to compare the traditional batch-stripped materials of C.Ex. A to the kneader-derived material of Ex. 1. The comparison is set forth in FIG. 2.

Example 11

A mixture of Solcal 31 calcium carbonate (3664 g), Epon 825 bisphenol A/epichlorohydrin epoxy resin (1566 g), JAS (185 g) and MEKP (2327 g) was milled in a 600 ml Labstar media mill (Netzsch, Exton Pa.) using 0.5 mm zirconia beads for 90 minutes at 3000 rpm consistent with procedures outlined in U.S. Provisional Patent Application Ser. No. 61/139,145, entitled "Nanocalcite Composites." Multiple passes were achieved through use of a Masterflex LS parastaltic pump (Cole-Parmer, Vernon Hills, N.J.), delivering the mixture to the mill at 250 ml/min. The pre-milled mixture of calcium carbonate/Epon 825 resin was vacuum fed according to the Devolatilization Procedure 1 to the LIST CRP 2.5 kneader which was heated to 100° C. and maintained under 1 mm Hg vacuum with kneading at 40 rpm over a period of 60 min. The contents of the kneader were emptied and analyzed by Gas Chromatography (GC) to determine weight % residual solvent and thermogravimetric analysis (TGA) was used to determine the concentration of nanocalcite in the resin. Additionally, a sample of Example 11 was diluted to 30% Silica by addition of EPON 828, mixed with Ethacure 100 (1.5 equivalents) and analyzed according to the General Procedure for Fracture Toughness determination. This cured sample of possessed an initial $K_{1C}$ value 1.96 characteristic of a nanocalcite-filled, Epon-based epoxy nanoresin.

Example 12

A mixture of 583 grams of propylene elastomer ("Engage 8401," Dow Chemical, Midland, Mich.), 550 g of isooctyltrimethoxysilane-modified Nalco 2326 sol (45 wt % Si) in toluene was vacuum fed according to the Devolatilization Procedure 1 to the LIST CRP 2.5 kneader which was heated to 153° C. and maintained under 1 mm Hg vacuum with kneading at 40 rpm over a period of 60 min. The contents of the kneader were emptied and analyzed by Gas Chromatography (GC) to determine weight % residual solvent and thermogravimetric analysis (TGA) was used to determine the concentration of nanosilica in the resin. Samples were pressed into clear thin films at 150° C., indicative of a highly-dispersed, nanofilled plastic.

Example 13

A mixture of Organosol 4 (56 wt % silica) and EPON 828 resin are mixed such that the loading of silica in the resin is 60 wt %. The resulting solution is pumped (via a diaphragm pump) to inlet to the LIST Discotherm B6 kneader, at rates consistent with a 45 minute residence time, into the first zone of the Discotherm B6 kneader. The speed of the main screw agitator shaft of the vacuum reactor is kept constant at approximately 34 rpm, while the discharge screw of the reactor is maintained at 47 rpm. Discharge of the material was facilitated by equipping the kneader's exit valve with a gear pump capable of pumping without loss of vacuum. Alternatively, the exit of the kneader can be equipped with a vacuum vessel capable of collecting the product under vacuum. Periodically vacuum is released on the vessel and the vessel is removed and replaced with another vessel. The reactor is maintained at a vacuum of about 0.6 kPa (5 torr) at a temperature profile of T1=110° C.; T2=134° C.; and T3=143° C. A well-dispersed epoxy nanocomposite is produced having a 60 wt % silica loading and a residual water and methoxypropanol level of less than 0.3 wt %.

A sample of Example 13 is diluted to 30% Silica by addition of EPON 828, mixed with Ethacure 100 (1.5 equivalents) and analyzed according to the General Procedure for Fracture Toughness determination. This cured sample of possesses an initial $K_{1C}$ value 1.30 characteristic of a nanosilica-filled, Epon-based epoxy nanoresin.

While embodiments of the invention have been described in sufficient detail, those skilled in the art will appreciate that changes or modifications, both foreseeable and unforeseen, may be made to the described embodiments without departing from the spirit or scope of the invention.

What is claimed:

1. A method of making a filled resin, comprising:
providing a feedstock comprising (i) untreated nanoparticles, (ii) a surface treatment agent reactive with the nanoparticles, and (iii) solvent; directing the feedstock through a continuous reactor maintained at a temperature sufficient to react the nanoparticles with the surface treatment agent to provide functionalized nanoparticles in less than about 4 hours; and
combining and homogeneously mixing the product of the reactor comprising functionalized nanoparticles and solvent with an organic polymer matrix in a vacuum kneader comprising an apparatus capable of mixing polymers and fillers under vacuum selected from apparatus comprising: a twin screw mixing apparatus; two intermeshing kneading blades; or a shaft in a cylindrical housing the shaft having disk elements thereon, said disk elements having attached peripheral bars, and the cylindrical housing having bars mounted on the inside designed to clean the shaft and disk elements as the shaft rotates, under conditions of temperature and vacuum sufficient to evaporate solvent and to provide the filled resin,
the functionalized nanoparticles comprising at least about 40% by weight of the filled resin and comprising nanoparticles selected from (a) inorganic materials selected from the group consisting of metals, inorganic oxides, inorganic sulfides, inorganic antimonides, inorganic salts, inorganic nitrides, inorganic pigments, metal coated particles, indium phosphide, aluminum phosphide, boron carbide, calcium carbide, calcium hydroxide, copper (II) hydroxide, lithium hydroxide, magnesium hydroxide, aluminum hydroxide, aluminum sulfate, calcium sulfate, cobalt(II) carbonate, copper(II) carbonate, copper(II) nitrate, copper(II) sulfate, lithium carbonate, lithium nitrate, lithium sulfate, magnesium carbonate, magnesium phosphate, magnesium sulfate, manganese(II) sulfate monohydrate, manganese(II) phosphate, nickel(II) carbonate, nickel(II) hydroxide, nickel(II) nitrate, zinc carbonate, zinc sulfate and combinations of two or more of the foregoing, and (b) organic materials selected from the group consisting of carbon black, organic pigments and combinations thereof, the nanoparticles being functionalized with a surface treatment agent selected from organosilanes, organotitanates, organozirconates, organoacids, organoamines, organothiols, phosphinic acids and combinations thereof; and the polymer matrix comprising a crosslinkable polymer selected from crosslinkable, ethylenically unsaturated polyesters, vinyl esters, acrylates, epoxy resins, curable imide resins, polycyanate ester and N,N'-bismaleimide resins.

2. The method of claim 1 wherein the inorganic oxide is selected from the group consisting of zirconia, aluminum oxide, titanium dioxide, iron oxide, zinc oxide, silicon dioxide (silica) antimony trioxide, boron oxide, boron suboxide, bismuth(III) oxide, copper(I) oxide, copper(II) oxide, chromium(III) oxide, iron(II) oxide, iron (III) oxide, magnesium oxide, manganese(IV) oxide and combinations of two or more of the foregoing.

3. The method of claim 1 wherein the nanoparticles consist essentially of one or more inorganic sulfides selected from the group consisting of copper(I) sulfide, copper(II) sulfide, zinc sulfide and combinations of two or more of the foregoing.

4. The method of claim 1 wherein the nanoparticles are selected from the group consisting of indium phosphide, aluminum phosphide, brass, metal coated glass, boron carbide, boron nitride, calcium carbide, calcium hydroxide, copper(II) hydroxide, lithium hydroxide, magnesium hydroxide, aluminum, aluminum hydroxide, aluminum sulfate, calcium sulfate, cobalt(II) carbonate, copper(II) carbonate, copper(II) nitrate, copper(II) sulfate, lithium carbonate, lithium nitrate, lithium sulfate, magnesium carbonate, magnesium phosphate, magnesium sulfate, manganese(II) sulfate monohydrate, manganese(II) phosphate, nickel(II) carbonate, nickel (II) hydroxide, nickel(II) nitrate, silicon dioxide, titanium dioxide zinc carbonate, zinc oxide, zinc sulfate and combinations of two or more of the foregoing.

5. The method of claim 1, wherein the nanoparticles have an average particle size less than about 100 nm.

6. The method of claim 5, wherein the nanoparticles have an average particle size less than about 50 nm.

7. The method of claim 1 wherein the surface treatment agent is selected from the group consisting of organosilanes, alkyl amines, aryl amines, alkyl thiols, aryl thiols, carboxylic acids and combinations of two or more of the foregoing.

8. The method of claim 1 wherein the nanoparticles comprise inorganic oxide particles and the surface treatment agent comprises organosilane selected from the group consisting of [2-(3-cyclohexenyl)ethyl]trimethoxysilane, trimethoxy(7-octen-1-yl)silane, isooctyl trimethoxy-silane, N-(3-triethoxysilylpropyl)methoxyethoxyethyl carbamate, N-(3-triethoxysilylpropyl)methoxyethoxyethyl carbamate, 3-(methacryloyloxy)propyltrimethoxysilane, allyl trimethoxysilane, 3-acryloxypropyltrimethoxysilane, 3-(methacryloyloxy)-propyltriethoxysilane, 3-(methacryloyloxy)propylmethyldimethoxysilane, 3-acryloyloxypropyl)methyldimethoxysilane, -9-3-(methacryloyloxy)propyl-dimethylethoxysilane, 3-(methacryloyloxy)propyldimethylethoxysilane, vinyldimethylethoxysilane, phenyltrimethoxysilane, n-octyltrimethoxysilane, dodecyltrimethoxysilane, isooctyltrimethoxysilane octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-tbutoxysilane, vinyltrisisobutoxysilane, vinyltriisopropenoxysilane, vinyltris(2-methoxyethoxy)silane, styrylethyltrimethoxysilane, mercaptopropyltrimethoxysilane, 3-glycidoxypropyltrimethoxysilane, heptamethyl(2-[tris(2-methoxyethoxy)-silyl]ethyl)trisiloxane, polydimethylsiloxane, arylsilanes, alkylsilanes and combinations of two or more of the foregoing.

9. The method of claim 1 further comprising crosslinking the resin.

10. The method of claim 1 wherein the functionalized particles are provided in less than about 2 hours.

* * * * *